US011656767B2

(12) United States Patent
Walker et al.

(10) Patent No.: US 11,656,767 B2
(45) Date of Patent: May 23, 2023

(54) NONVOLATILE STORAGE DEVICE WITH VOLATILE MEMORY

(71) Applicant: Quantum Corporation, San Jose, CA (US)

(72) Inventors: Robert I. Walker, Clearwater Beach, FL (US); Marc A. Smith, Flushing, MI (US); Don Doerner, San Jose, CA (US)

(73) Assignee: QUANTUM CORPORATION, San Jose, CA (US)

( * ) Notice: Subject to any disclaimer, the term of this patent is extended or adjusted under 35 U.S.C. 154(b) by 137 days.

(21) Appl. No.: 17/227,516

(22) Filed: Apr. 12, 2021

(65) Prior Publication Data

US 2021/0318808 A1 Oct. 14, 2021

Related U.S. Application Data

(60) Provisional application No. 63/009,030, filed on Apr. 13, 2020.

(51) Int. Cl.
*G06F 3/06* (2006.01)
*G06F 11/14* (2006.01)
*G06F 1/30* (2006.01)

(52) U.S. Cl.
CPC .............. *G06F 3/0619* (2013.01); *G06F 1/30* (2013.01); *G06F 3/0659* (2013.01); *G06F 3/0689* (2013.01); *G06F 11/1451* (2013.01); *G06F 11/1461* (2013.01); *G06F 11/1469* (2013.01)

(58) Field of Classification Search
None
See application file for complete search history.

(56) References Cited

U.S. PATENT DOCUMENTS

| 7,421,552 | B2* | 9/2008 | Long | G06F 11/1441 |
| | | | | 714/E11.138 |
| 8,479,124 | B1* | 7/2013 | Baxter | G06F 13/1694 |
| | | | | 715/964 |
| 2013/0148457 | A1* | 6/2013 | Sweere | G11C 5/143 |
| | | | | 365/228 |
| 2016/0321175 | A1* | 11/2016 | Kobayashi | G06F 1/3275 |
| 2017/0199684 | A1* | 7/2017 | Alavi | G06F 11/1402 |
| 2020/0341666 | A1* | 10/2020 | Bassov | G06F 11/1004 |

* cited by examiner

*Primary Examiner* — Kaushikkumar M Patel
(74) *Attorney, Agent, or Firm* — Roeder & Broder LLP; James P. Broder

(57) ABSTRACT

Nonvolatile data storage systems, methods, and devices are disclosed. In one example, a nonvolatile storage device includes a volatile memory, a controller electrically coupled to the volatile memory, a nonvolatile memory electrically coupled to the controller, and a backup power source electrically coupled to the controller, the volatile memory, and the nonvolatile memory. The controller is configured to read and write primary data from a primary host and mirrored data from a secondary host in the volatile memory. The backup power source is configured to store sufficient energy to power the nonvolatile storage device during a backup operation. The controller is configured to, in response to a backup signal, copy the primary data and the mirrored data stored in the volatile memory to the nonvolatile memory.

20 Claims, 5 Drawing Sheets

NONVOLATILE STORAGE DEVICE WITH VOLATILE MEMORY

CROSS REFERENCE TO RELATED APPLICATION

This application claims the benefit of and priority from U.S. Provisional Patent Application No. 63/009,030 entitled "NON-VOLATILE STORAGE DEVICE WITH VOLATILE MEMORY," filed Apr. 13, 2020, the entire disclosures of which is incorporated herein by reference.

BACKGROUND

Data storage systems have competing goals of speed of access to data and data durability that influence the selection of storage medium. In general, volatile memory provides faster storing and access to data while nonvolatile memory provides data durability.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Described herein are storage systems, methods, and devices that include volatile memory, nonvolatile memory, and a backup power source to allow for use of volatile memory during normal operation while having sufficient onboard backup power to store the contents of the volatile memory to nonvolatile memory in the event of a system failure. In this manner, the described storage systems, methods, and devices provide the performance benefits of volatile memory with the data durability of nonvolatile memory.

Figure 1:
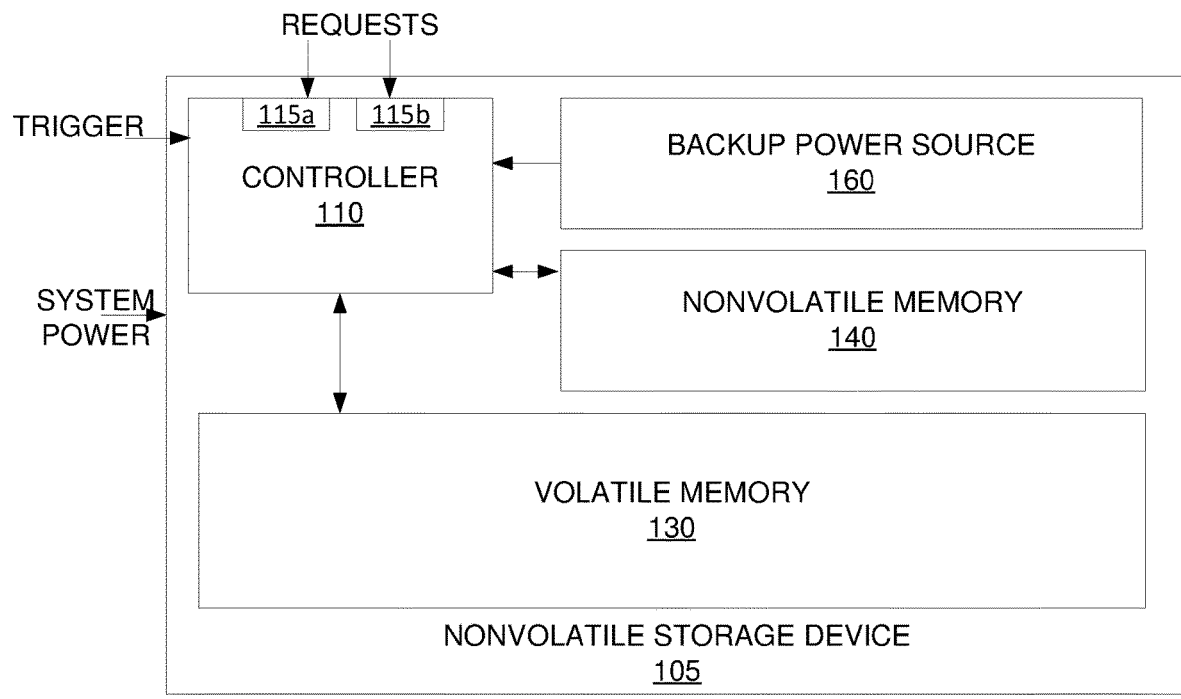
FIG. 1 is a block diagram of an example nonvolatile storage device, in accordance with various aspects described.

FIG. 1 is a block diagram of an example nonvolatile storage device (NVSD) 105 that provides very fast, low latency I/O storage. The NVSD 105 appears as a dual-ported NVMe host controller with one or more namespace block devices. The NVSD 105 is suitable for use in a "cluster-in-a-box" type chassis that includes two server "canisters" that reside in a single physical housing where they share a common mid-plane (see FIG. 2). The NVSD 105 includes a controller 110 with two peripheral component interconnect (PCI)/nonvolatile memory express (NVMe) interface protocol ports 115a, 115b. The NVSD 105 further includes a volatile memory 130, a nonvolatile memory 140, and a backup power source 160. The controller 110 has two independent portions each configured to be connected to a single host by way of one of the PCI/NVMe ports 115a, 115b. Each portion of the controller is configured to receive requests from one of the hosts to read and write data in the volatile memory simultaneously and independently of operation of the other portion of the controller receiving and processing requests from the other hosts to read and write date in the volatile memory.

The nonvolatile memory 140 is configured with capacity to store the data stored in the volatile memory 130 (e.g., 32 GB in one example) which may be shared evenly between the two hosts. The backup power source 160 is configured to store sufficient energy to power the NVSD 105 (including controller, nonvolatile memory, and volatile memory). The controller 110 is configured to, in response to a backup signal (indicative of, for example, a system power failure), perform a backup operation that includes copying the data stored in the volatile memory 130 to the nonvolatile memory 140. The controller 110 is also configured to, in response to a restore trigger (indicative of, for example, restoration of system power), copy the data stored in the nonvolatile memory 140 to the volatile memory 130.

Figure 2:
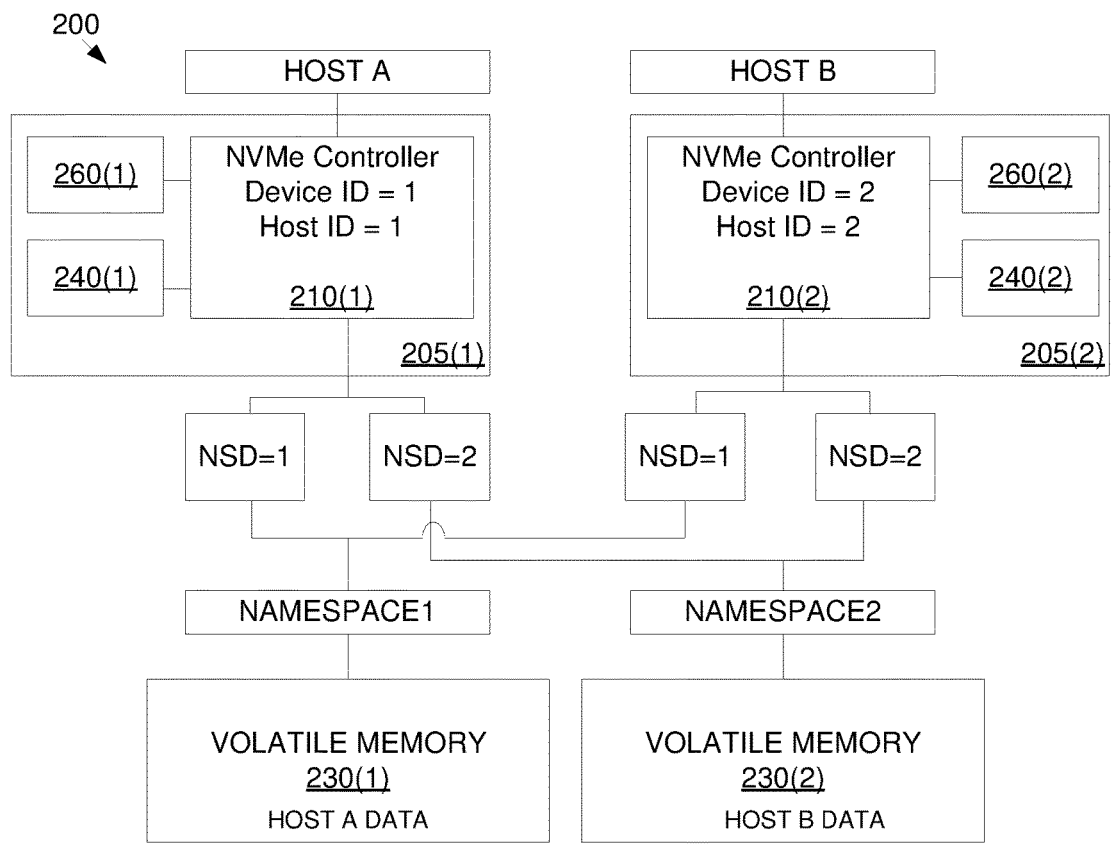
FIG. 2 is a block diagram of an example nonvolatile storage system, in accordance with various aspects described.

FIG. 2 illustrates an exemplary NVSD system or appliance 200 that includes two NVSDs 205(1), 205(2) in the same chassis. During normal operation of the NVSD, the host operating system will read and write data from/to the NVSD system using NVMe namespace block devices NSD 1, NSD 2. In another example the NVSD controller itself does the mirroring (copying) of data between the volatile memory 230(1) in NVSD 1 and the volatile memory 230(2) in NVSD 2. The "working memory" that the NVSD uses to process requests from its host is volatile memory 230 (e.g., dynamic random access memory (DRAM)). Each NVSD 205 is configured to use the "on-board" volatile memory 230 as working memory while also having mirroring access to the peer volatile memory 230.

Redundancy is achieved via backup power sources 260(1), 260(2) (e.g., "super capacitors") and the nonvolatile memory 240(1), 240(2) (e.g., NAND flash memory). When system power is lost (or other failure is detected) the controller 210(1) copies the data from the volatile memory 230(1) to the nonvolatile memory 240(1) and the controller 210(2) copies the data from the volatile memory 230(2) to the nonvolatile memory 240(2). The respective backup power sources 260(1), 260(2) provide enough run-time current (e.g., several seconds) in order to allow the data to copy completely from the respective volatile memories 230(1), 230(2) to the respective nonvolatile memories 240(1), 240(2).

When the system power is restored (or other restore trigger is received by the controllers 210(1), 210(2)), the controllers 210(1), 210(2) copy data from their corresponding one of the nonvolatile memories 240(1), 240(2) to the their corresponding one of volatile memories 230(1), 230(2), as part of its initialization procedure. When the operating system boots, the NVSD will contain the usable data that was previously there prior to power-off (or other failure). The backup/restore functions are automatic and managed via the controllers 210(1), 210(2).

In the dual controller NVSD system or appliance 200, each canister has an NVSD 205 that is installed locally (physically) in that server's chassis/housing. Each controller 210 (server) can access (read/write) the peer canister's NVSD. So when both controllers 210(1), 210(2) are powered on, and booted into its operation system instance, the NVSDs 205(1), 205(2) will each see the local NVSD NVMe namespace block devices, as well as the remote or peer NVSD namespace block devices. The devices are "shared" using PCIe lanes in the mid-plane of the chassis.

The sharing of the NVSD namespace block devices in the NVSD system 200 provides data availability. The system mirrors data using software RAID 1 arrays in each controller 210(1), 210(2). Each RAID 1 array uses a piece of the local NVSD and a piece of the remote NVSD (e.g., different portions of the volatile memories 230(1), 230(2) associated with each namespace). This way if one of the controllers 210(1), 210(2) fails or is removed, the remaining controller and NVSD will still have a copy of the failed controller's data as part of the RAID 1 mirror sets.

Figure 3:
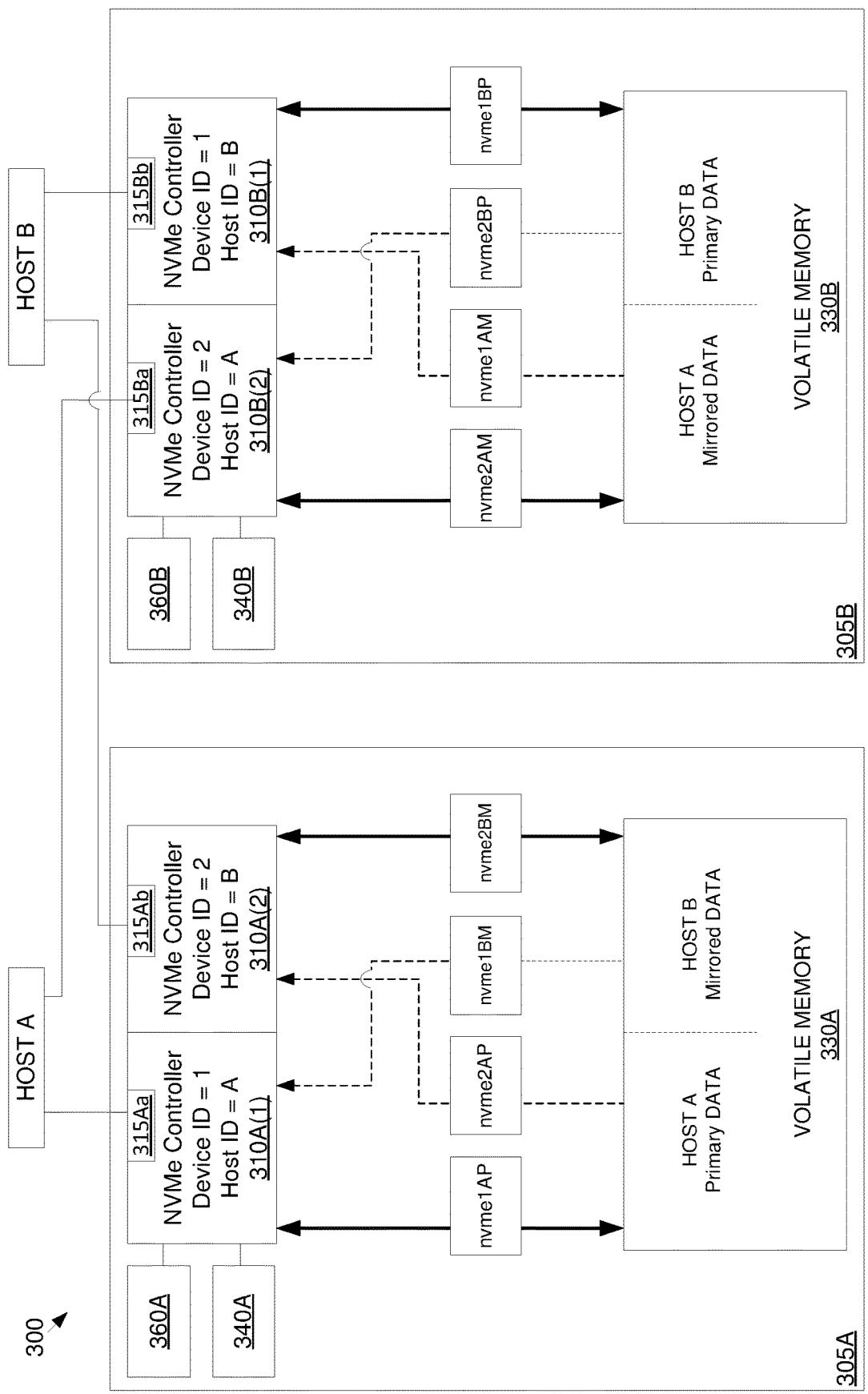
FIG. 3 is a block diagram of an example nonvolatile storage system, in accordance with various aspects described.

FIG. 3 is a block diagram illustrating an exemplary nonvolatile data storage system 300 that includes two NVSDs 305A and 305B. In FIG. 3 primary data flow is shown in solid line while secondary or failover data flow is shown in dashed line. Each NVSD includes volatile memory 330, nonvolatile memory 340 and a backup power source 360 coupled to a controller 310 as illustrated in FIG. 1. Each controller is divided into two independently operable portions denoted (1) and (2) and each portion is electrically coupled by way of a port 315a, 315b, respectively, to one of two hosts. Each controller portion is configured to independently process read/write requests from its primary host simultaneously with the other controller portion processing read/write requests from its primary host.

The volatile memory 330 in each NVSD device is partitioned into two partitions, one partition that stores primary data from the primary host and a second partition that stores mirrored data from the secondary host. One controller in each pair reads/writes primary data for one host while the other controller reads/writes mirrored data for the other host. Each controller can read data for the "other" host in the event of a failure of the other controller or host.

During primary operation, host A communicates with controller 310A(1) through port 315Aa to read and write primary data in the volatile memory associated with namespace nvme1AP. Host B communicates with controller 310A(2) through port 315Ab to write mirrored data in the volatile memory associated with namespace nvme2BM. By virtue of a RAID 1 configuration for host A, the namespace nvme1AP is part of a mirror protected unit with nvme2AM in the second NVSD 305B. This means that as host A writes data through nvme1AP to volatile memory 330A, the data is also being written through controller 310B(2) nvme2AM to volatile memory 330B of the second NVSD.

Host B communicates with controller 310B(1) through port 315Bb to read and write primary data in the volatile memory associated with namespace nvme1BP. By virtue of a RAID 1 configuration for host B, the namespace nvme1BP is part of a mirror protected unit with nvme2BM in the first NVSD 305A. This means that as host B writes data through nvme1BP to volatile memory 330B, the data is also being written through controller 310A(2) nvme2BM to volatile memory 330A of the first NVSD.

During secondary or failover operation, should NVSD 305B fail or host B be removed, controller 310A(1) can read host B's mirrored data by way of nvme1BM. Likewise, should NVSD 305A fail or host A be removed, controller 310B(1) can read host A's mirrored data by way of nvme1AM.

In the event of a power failure or other interruption, each NVSD device 305A, 305B is powered by a respective backup power source 360A, 360B to store the contents of the volatile memory 330 in nonvolatile memory 340. Thus, each device backs up data from its primary host as well as data from its secondary host. When the data is transferred back to volatile memory 330, the namespace configurations observed by the controllers 310 ensure that access to mirrored data for the other host is always provided.

Figure 4:
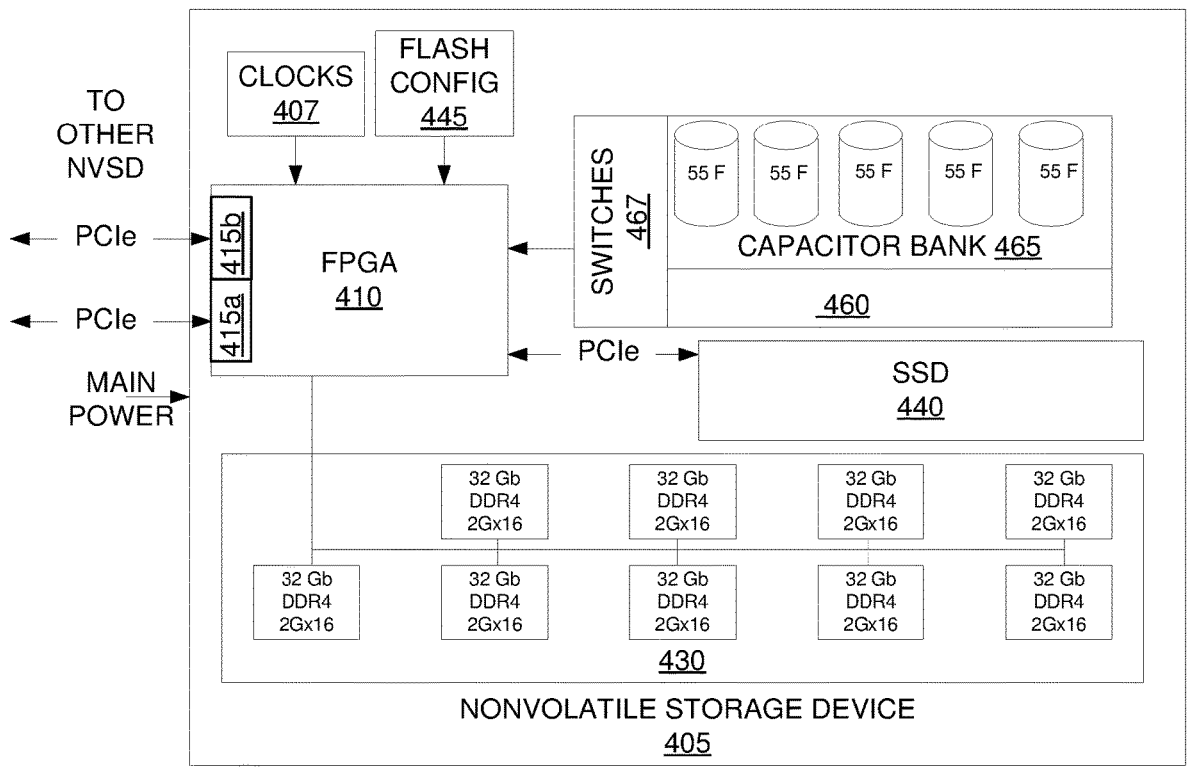
FIG. 4 is a block diagram of an example nonvolatile storage device, in accordance with various aspects described.

FIG. 4 is a block diagram illustrating one example of an NVSD 405. In the illustrated example, the controller includes a field programmable gate array (FPGA) 410 divided into two independently operable portions each providing a PCI/NVMe port 415a, 415b. The volatile memory 430 includes a 32 GB small outline dual inline memory module (SODIMM). The backup power source 460 includes switches 467 and a capacitor bank with five electric double-layer capacitor (EDLC) hold-up power cells. The nonvolatile memory 440 includes a solid state drive (SSD) with 32 GB of flash memory. The SSD is selected to have a minimum transfer speed that is less than the capacitor hold up time of the capacitor bank in the backup power source 460. PCIe buses are used to connect the NVSD 405 to another NVSD (not shown) in a mid-plane of a NVSD system (see FIG. 2).

Figure 5:
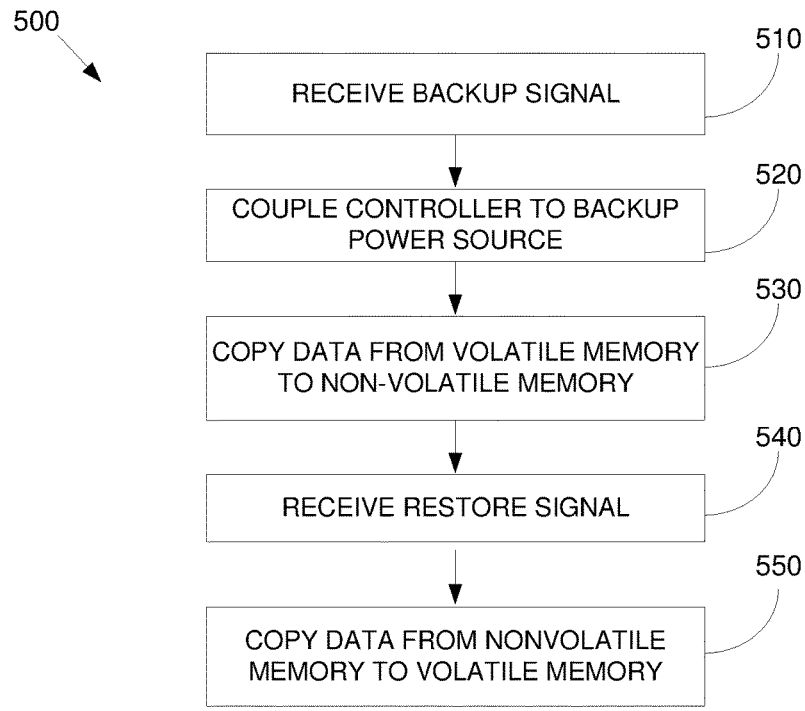
FIG. 5 illustrates an example method for providing a nonvolatile storage device with volatile working memory, in accordance with various aspects described.

FIG. 5 is a flow diagram outlining an example method 500 that may be performed by a controller of an NVSD device (e.g., devices 105, 205, 305 of FIGS. 1, 2, 3, respectively). At 510, the method includes receiving a backup signal. The backup signal may be, for example, a signal indicating that system power has been lost. At 520, the method includes coupling a backup power source to the controller and at 530 the method includes copying data from the volatile memory to the nonvolatile memory. At 540 a restore signal is received and at 550, in response, the data is copied form the nonvolatile memory to the volatile memory. The restore signal may be, for example, the powering on or booting of the NVSD.

Figure 6:
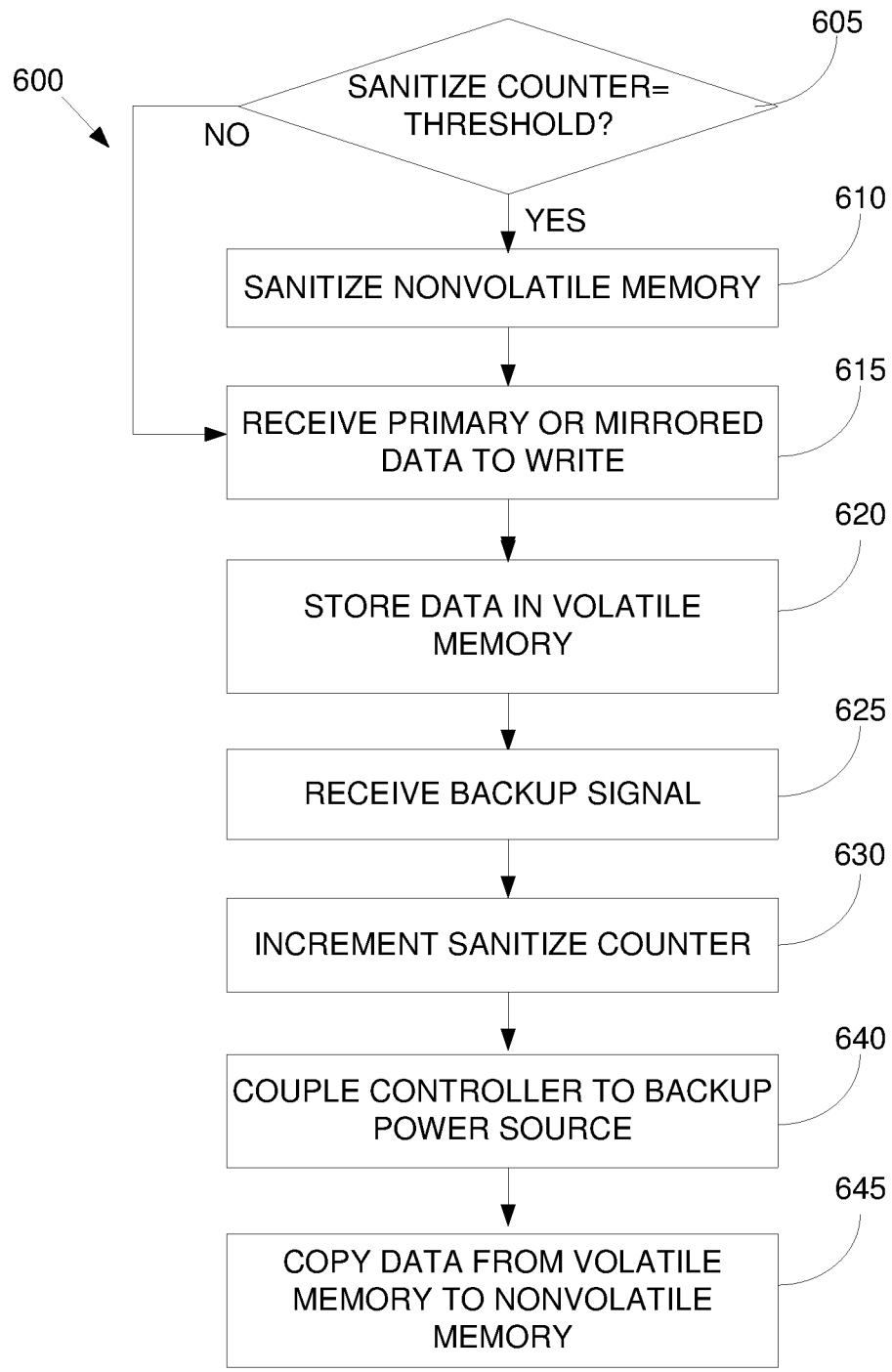
FIG. 6 illustrates an example method for providing a nonvolatile storage device with volatile working memory, in accordance with various aspects described.

FIG. 6 is a flow diagram outlining a method 600 for operating a nonvolatile storage device with an optional sanitize feature. The method 600 may be performed by controller 110, 210, 310, or 410 of FIGS. 1, 2, 3, 4 respectively. At 605, a sanitize counter is checked to determine if a threshold count has been reached. In one example, the threshold count is 10. If the threshold count has been reached, at 610, the nonvolatile memory is sanitized using, for example, an NVMe SANITIZE command. This periodic sanitizing of the nonvolatile memory (e.g., SSD) ensures that the SSD is kept in high performance mode and does not slow down performance due to background housekeeping firmware to remove used blocks. While an ERASE or FORMAT command may provide some benefit, the SANITZE command avoids early life mortality due to wear-leveling (i.e., wearing the SSD early by excessive background operations).

At 615 the method includes receiving primary or mirrored data to write to the volatile memory. At 620 the data is stored in volatile memory. At 625 a backup signal is received and at 630 the sanitize counter is incremented. At 640 the backup power source is coupled to the controller. At 645, the data is copied to the nonvolatile memory.

Figure 7:
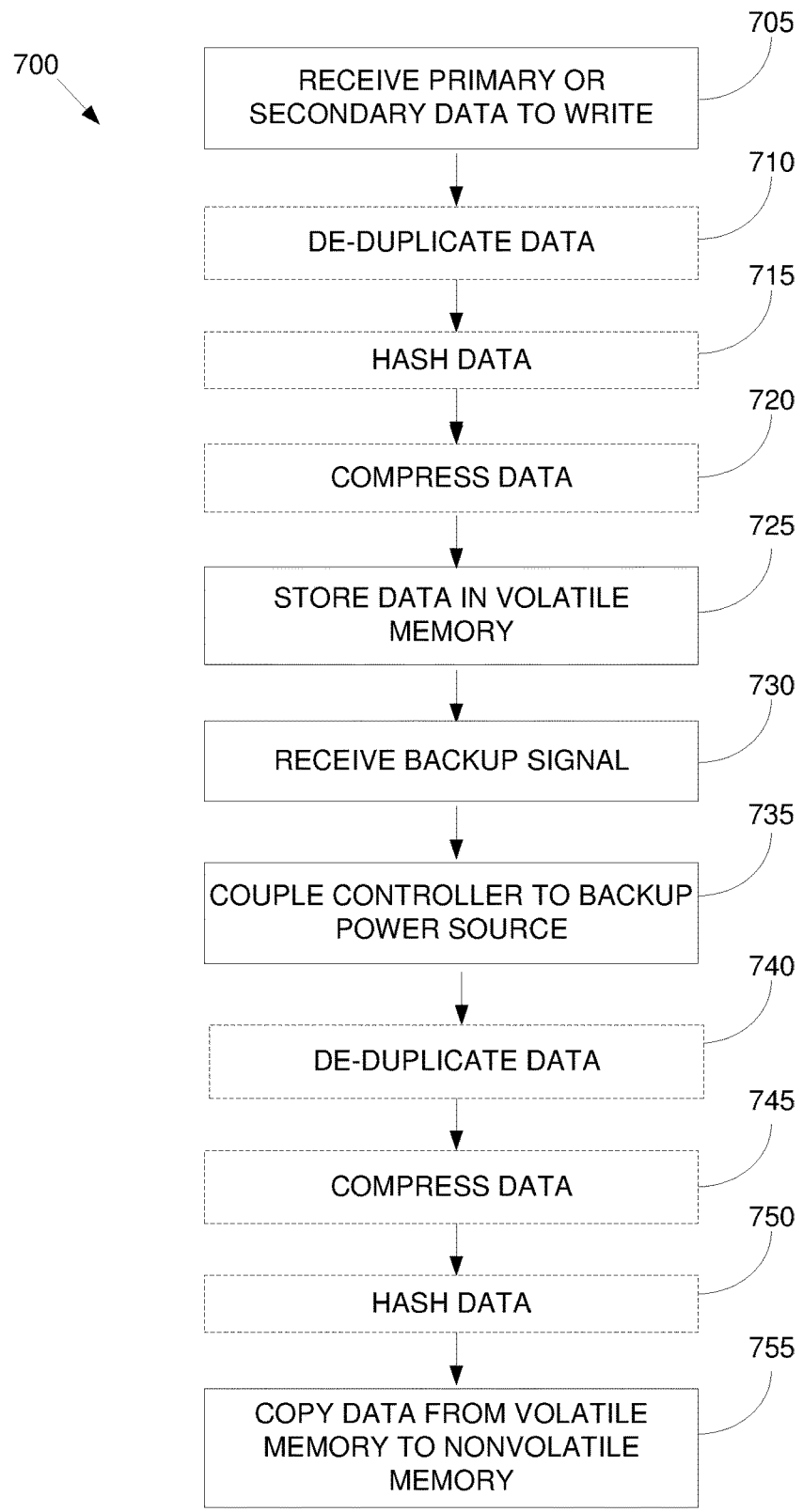
FIG. 7 illustrates an example method for providing a nonvolatile storage device with volatile working memory, in accordance with various aspects described.

FIG. 7 is a flow diagram outlining a method 700 for operating a nonvolatile storage device with several optional features. The method 700 may be performed by controller 110, 210, 310, or 410 of FIGS. 1, 2, 3, 4 respectively. The optional operations may be performed either prior to writing the data to volatile memory or prior to writing data from the volatile memory to the nonvolatile memory. At 705 the method includes receiving primary or mirrored data to write to the volatile memory. At 710 an optional de-duplication operation is performed. At 715 an optional security hashing operation is performed. At 720 an optional compression operation is performed. At 725 the de-duplicated/hashed/compressed data is stored in volatile memory. At 730 at backup signal is received and at 735 the backup power source is coupled to the controller.

If any of operations 710, 715, or 720 were not performed prior to storing the data in volatile memory, then these operations may be performed at 740, 745, 750, respectively. At 755 the de-duplicated/hashed/compressed data is copied to the nonvolatile memory.

In one example, the controller provides multiple health commands to monitor the status of many of the NVSD components. For example, the controller may provide health commands that periodically check or determine the status of the NVSD, a link status between two NVSDs in a system, a completion of device initialization, a completion of the last backup or restore operation, state of the backup power source, sanitize counter value, whether the NVSD has the backup feature enabled, serial number, model number, firmware version, and/or SMART (e.g., an estimated remaining life of a memory device based on factors including average temperature) of the nonvolatile memory.

It can be seen from the foregoing description that by providing a nonvolatile storage device with a volatile working memory and a backup system that allows the device to store data in the working memory to a nonvolatile memory when the volatile memory loses power from a system power source, the advantages of volatile memory in terms of speed and endurance can be leveraged while maintaining the data durability of storage in nonvolatile memory. Two nonvolatile storage devices may be coupled to the same volatile memory to provide data availability through mirroring.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for implementing a storage array according to embodiments and examples described herein.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "logic," "module," "component," "system," "circuit," "circuitry," "element," "slice," and the like are intended to refer to a computer-related entity, hardware, software (e.g., in execution), and/or firmware. For example, logic or circuitry or a similar term can be a processor, a process running on a processor, a controller, an object, an executable program, a storage device, and/or a computer with a processing device. By way of illustration, an application running on a server and the server can also be a logic or circuitry. One or more logics or circuitries can reside within a process, and logic or circuitry can be localized on one computer and/or distributed between two or more computers. A set of elements or a set of other circuitry can be described herein, in which the term "set" can be interpreted as "one or more."

As another example, logic or circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, logic or circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "includes," "including," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A nonvolatile storage device, comprising:
   a volatile memory;
   a controller that is electrically coupled to the volatile memory, the controller including (i) a first port to receive requests from a primary host that cause the controller to write primary data in the volatile memory; and (ii) a second port to receive requests from a secondary host that cause the controller to write mirrored data in the volatile memory;
   a nonvolatile memory that is electrically coupled to the controller; and
   a backup power source that is electrically coupled to the controller, the volatile memory, and the nonvolatile memory, the backup power source being configured to store sufficient energy to power the nonvolatile storage device during a backup operation;
   wherein the primary data is stored in a first namespace of the volatile memory, the first namespace being part of a RAID 1 mirror protected unit with a second namespace in second volatile memory of a second nonvolatile storage device in which the secondary host reads and writes primary data;
   wherein the mirrored data is stored in a third namespace of the volatile memory, the third namespace being part of a RAID 1 mirror protected unit with a fourth namespace of the second volatile memory in the second nonvolatile storage device; and
   wherein, in response to a backup signal, the controller is configured to perform the backup operation including copying one of the primary data and the mirrored data stored in the volatile memory to the nonvolatile memory.

2. The nonvolatile storage device of claim 1, wherein, in response to a restore trigger, the controller is configured to copy the one of the primary data and the mirrored data stored in the nonvolatile memory to the volatile memory.

3. The nonvolatile storage device of claim 1, wherein the controller is configured according to a nonvolatile memory express (NVMe) interface protocol.

4. The nonvolatile storage device of claim 1, wherein the controller includes a field programmable gate array (FPGA) including a first portion electrically coupled to the first port and a second portion electrically coupled to the second port, and wherein the first portion and the second portion operate independently of one another to process the requests from the primary host and the secondary host, respectively.

5. The nonvolatile storage device of claim 1, wherein the nonvolatile memory includes solid state drive (SSD) memory.

6. The nonvolatile storage device of claim 5, wherein the controller is configured to perform a sanitize operation on the SSD memory periodically as a function of a number of backup operations that have been performed utilizing the nonvolatile storage device.

7. The nonvolatile storage device of claim 1, wherein the controller is configured to periodically check one or more of: (i) a state of the nonvolatile storage device, (ii) a status of a link between the nonvolatile storage device and a second nonvolatile storage device, (iii) completion status of last initialization, (iv) completion status of a last backup operation, (v) completion status of a last restore operation, (vi) a status of the backup power source, (vii) a number of backup operations performed since a last sanitize operation, (viii) an enablement status of the backup operation, and (ix) an estimated remaining life for the nonvolatile memory.

8. The nonvolatile storage device of claim 1, wherein the backup signal is indicative of one or more of a failure of a system power source for the nonvolatile storage device, and a failure of the volatile memory.

9. The nonvolatile storage device of claim 1, wherein the controller is configured to perform at least one of a de-duplication operation, a hashing operation, and a compression operation on the one of the primary data and the mirrored data prior to storing the one of the primary data and the mirrored data in one of the volatile memory and the nonvolatile memory.

10. A method for providing a nonvolatile storage device, the method comprising:
   receiving primary data and mirrored data;
   electrically coupling a controller to volatile memory;
   receiving requests from a primary host via a first port of the controller that cause the controller to write the primary data in the volatile memory;
   receiving requests from a secondary host via a second port of the controller that cause the controller to write the mirrored data in the volatile memory;
   storing the primary data in a first namespace of the volatile memory, the first namespace being part of a RAID 1 mirror protected unit with a second namespace in second volatile memory of a second nonvolatile storage device in which the secondary host reads and writes primary data;
   storing the mirrored data in a third namespace of the volatile memory, the third namespace being part of a RAID 1 mirror protected unit with a fourth namespace of the second volatile memory in the second nonvolatile storage device;
   receiving a backup signal; and
   in response to the backup signal:
      coupling a backup power source to the controller; and
      copying one of the primary data and the mirrored data stored in the volatile memory to a nonvolatile memory with the controller.

11. The method of claim 10, further comprising de-duplicating the one of the primary data and the mirrored data prior to storing the one of the primary data and the mirrored data in the volatile memory.

12. The method of claim 10, further comprising performing a hashing operation on the one of the primary data and the mirrored data prior to storing the one of the primary data and the mirrored data in the volatile memory.

13. The method of claim 10, further comprising compressing the one of the primary data and the mirrored data prior to storing the one of the primary data and the mirrored data in the volatile memory.

14. The method of claim 10, further comprising de-duplicating the one of the primary data and the mirrored data prior to copying the one of the primary data and the mirrored data to the nonvolatile memory.

15. The method of claim 10, further comprising performing a hashing operation on the one of the primary data and the mirrored data prior to copying the one of the primary data and the mirrored data to the nonvolatile memory.

16. The method of claim 10, further comprising compressing the one of the primary data and the mirrored data prior to copying the one of the primary data and the mirrored data to the nonvolatile memory.

17. The method of claim 10, further comprising:
receiving a restore signal; and
in response to the restore signal, copying data from the nonvolatile memory to the volatile memory.

18. A nonvolatile data storage system, comprising:
a first nonvolatile storage device including a first controller, a first backup power source, a first volatile memory, and a first nonvolatile memory, the first controller being configured to:
independently process requests received from a primary host and a secondary host to write data to the first volatile memory; and
in response to a backup signal;
couple the first backup power source to the first controller; and
copy the data in the first volatile memory to the first nonvolatile memory; and
a second nonvolatile storage device including a second controller, a second backup power source, a second volatile memory, and a second nonvolatile memory, the second controller being configured to:
independently process requests received from the primary host and the secondary host to write data to the second volatile memory; and
in response to a second backup signal;
couple the second backup power source to the second controller; and
copy the data in the second volatile memory to the second nonvolatile memory;
wherein in the first nonvolatile storage device, primary data from the primary host is stored in a first namespace of the first volatile memory, the first namespace being part of a RAID 1 mirror protected unit with a second namespace in the second volatile memory, and mirrored data from the secondary host is stored in a third namespace of the first volatile memory, the third namespace being part of a RAID 1 mirror protected unit with a fourth namespace of the second volatile memory; and
wherein in the second nonvolatile storage device, primary data from the secondary host is stored in the fourth namespace of the second volatile memory, and mirrored data from the primary host is stored in the second namespace of the second volatile memory.

19. The nonvolatile data storage system of claim 18, wherein
the first and second controllers are configured according to a nonvolatile memory express (NVMe) interface protocol.

20. The method of claim 10 further comprising periodically checking with the controller one or more of: (i) a state of the nonvolatile storage device, (ii) a status of a link between the nonvolatile storage device and a second nonvolatile storage device, (iii) completion status of last initialization, (iv) completion status of a last backup operation, (v) completion status of a last restore operation, (vi) a status of the backup power source, (vii) a number of backup operations performed since a last sanitize operation, (viii) an enablement status of the backup operation, and (ix) an estimated remaining life for the nonvolatile memory.

* * * * *